(12) United States Patent
Kulakov

(10) Patent No.: US 8,858,910 B2
(45) Date of Patent: Oct. 14, 2014

(54) DEVICE FOR AND METHOD OF STORAGE AND GENERATION OF HYDROGEN FOR AUTONOMOUS CURRENT SOURCES BASED ON FUEL CELLS

(75) Inventor: Evgeny B. Kulakov, North York (CA)

(73) Assignee: Altek Capital, Inc., Brooklyn, NY (US)

( * ) Notice: Subject to any disclaimer, the term of this patent is extended or adjusted under 35 U.S.C. 154(b) by 1711 days.

(21) Appl. No.: 11/703,970

(22) Filed: Feb. 8, 2007

(65) Prior Publication Data

US 2008/0193806 A1     Aug. 14, 2008

(51) Int. Cl.
*B01J 7/00* (2006.01)
*B01J 7/02* (2006.01)
*C01B 3/00* (2006.01)
*H01M 8/06* (2006.01)
*C01B 3/10* (2006.01)

(52) U.S. Cl.
CPC ......... *H01M 8/065* (2013.01); *C01B 2203/066* (2013.01); *Y02B 90/18* (2013.01); *C01B 3/10* (2013.01); *Y02E 60/50* (2013.01); *H01M 2250/30* (2013.01); *C01B 2203/0405* (2013.01); *Y02E 60/36* (2013.01)

USPC ........................................... 423/657; 423/627

(58) Field of Classification Search
None
See application file for complete search history.

(56) References Cited

U.S. PATENT DOCUMENTS

| | | | | |
|---|---|---|---|---|
| 4,150,197 A | * | 4/1979 | Zaromb | 429/404 |
| 5,266,356 A | * | 11/1993 | Buchheit et al. | 427/372.2 |
| 5,721,068 A | * | 2/1998 | West et al. | 429/300 |
| 6,372,371 B1 | * | 4/2002 | Iarochenko et al. | 429/406 |
| 6,506,360 B1 | * | 1/2003 | Andersen et al. | 423/657 |
| 6,737,185 B1 | * | 5/2004 | Carreiro et al. | 429/402 |
| 2002/0022160 A1 | * | 2/2002 | Schmidt | 429/5 |
| 2002/0081235 A1 | * | 6/2002 | Baldwin et al. | 422/105 |
| 2005/0158595 A1 | * | 7/2005 | Marsh et al. | 429/19 |

* cited by examiner

*Primary Examiner* — Barbara Gilliam
*Assistant Examiner* — Steven Scully
(74) *Attorney, Agent, or Firm* — Henry M Feiereisen, LLC

(57) ABSTRACT

A device for generating hydrogen for power system based on hydrolysis aluminum assisted water split has a housing, a unit for containing aluminum in the housing, a unit for periodically bringing the aluminum and the electrolyte in contact for production of hydrogen, and a unit for the withdrawing the hydrogen to a power source.

2 Claims, 7 Drawing Sheets

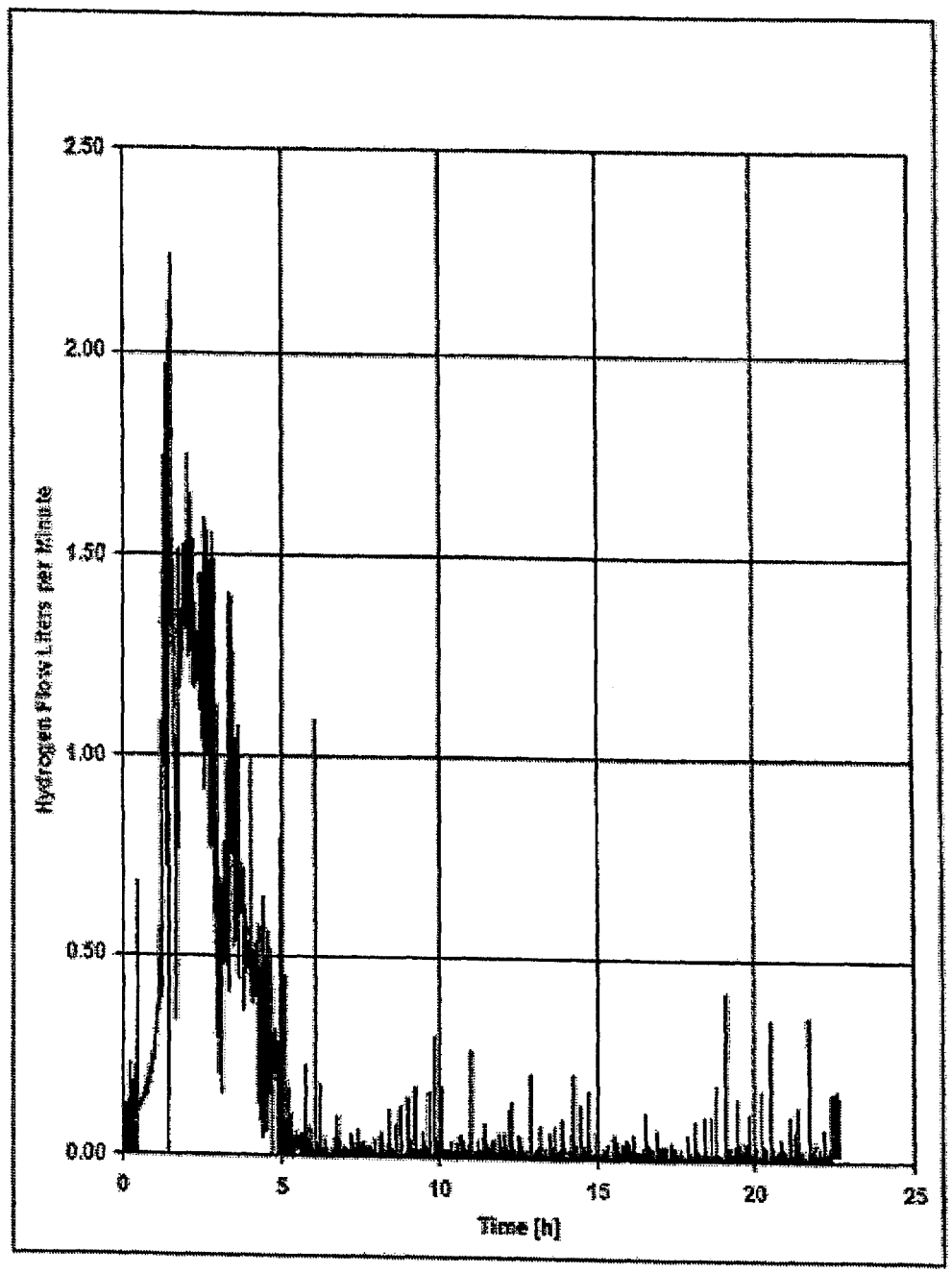
FIG. 4 a graph of hydrogen generation rate versus time for a hydrogen production by aluminum assisted water split according to the present invention.

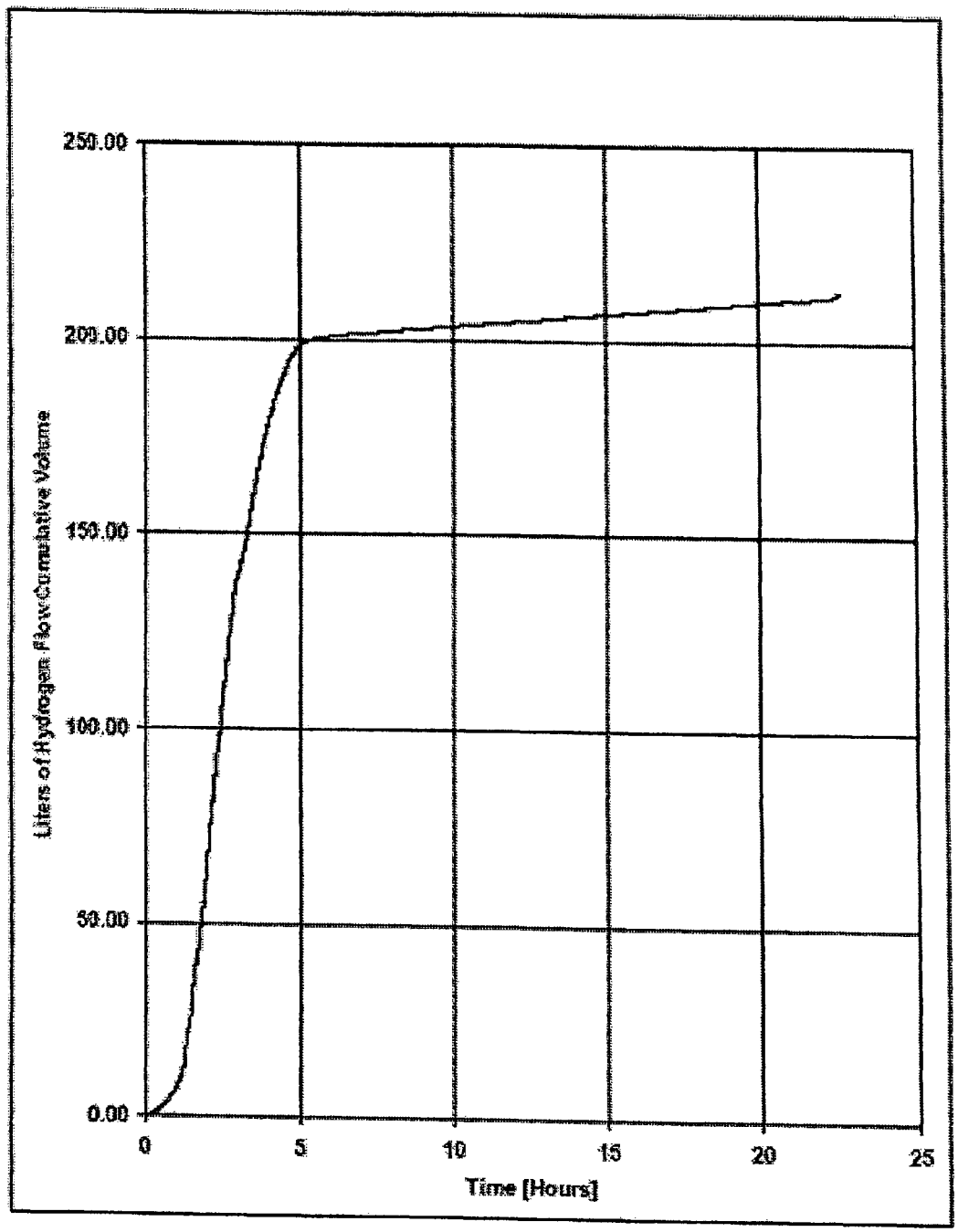
FIG.5 a graph of the total amount of hydrogen produced versus time for a hydrogen production by aluminum assisted water split according to the present invention.

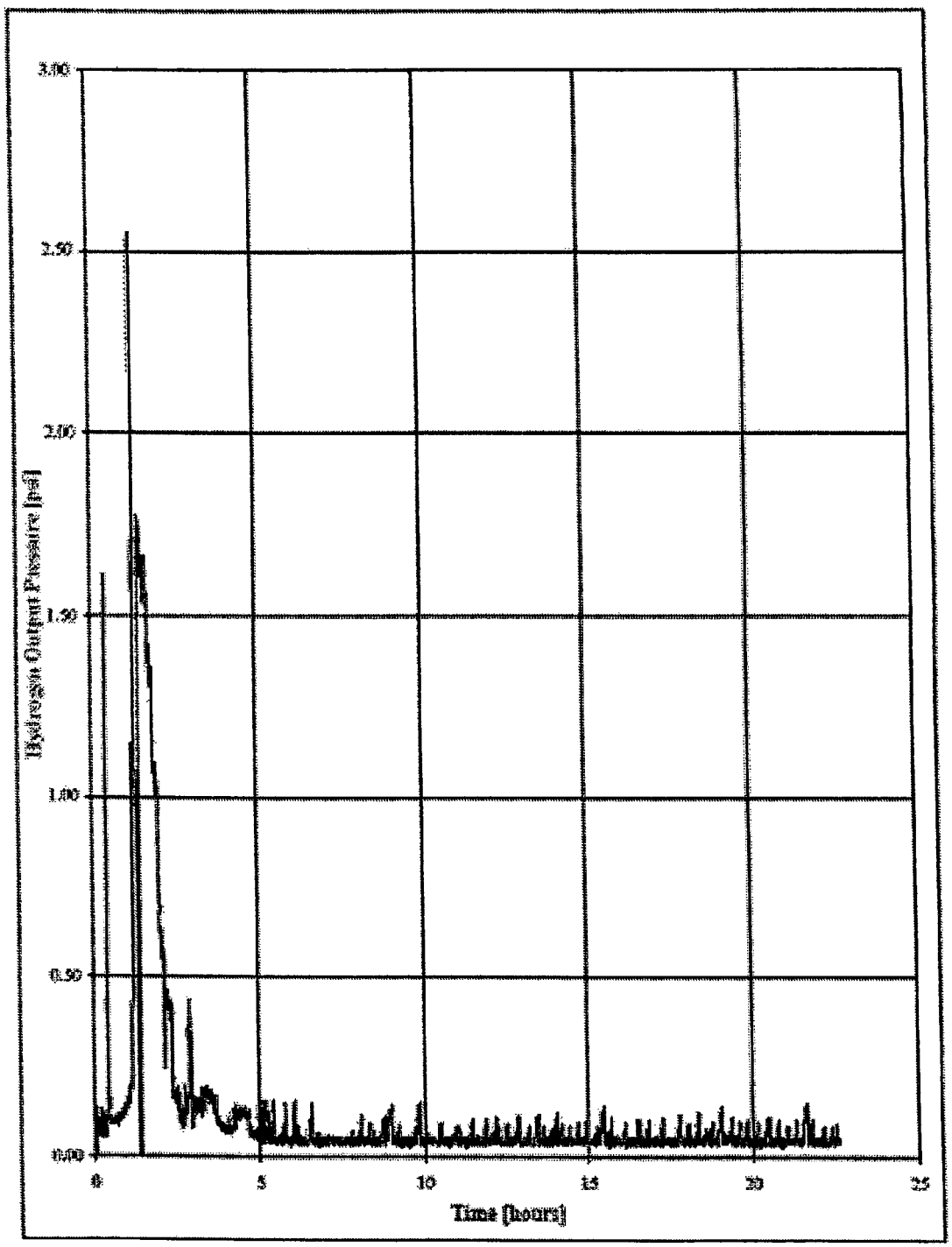
FIG.6 a graph of the hydrogen output pressure versus time for a hydrogen production by aluminum assisted water split according to the present invention.

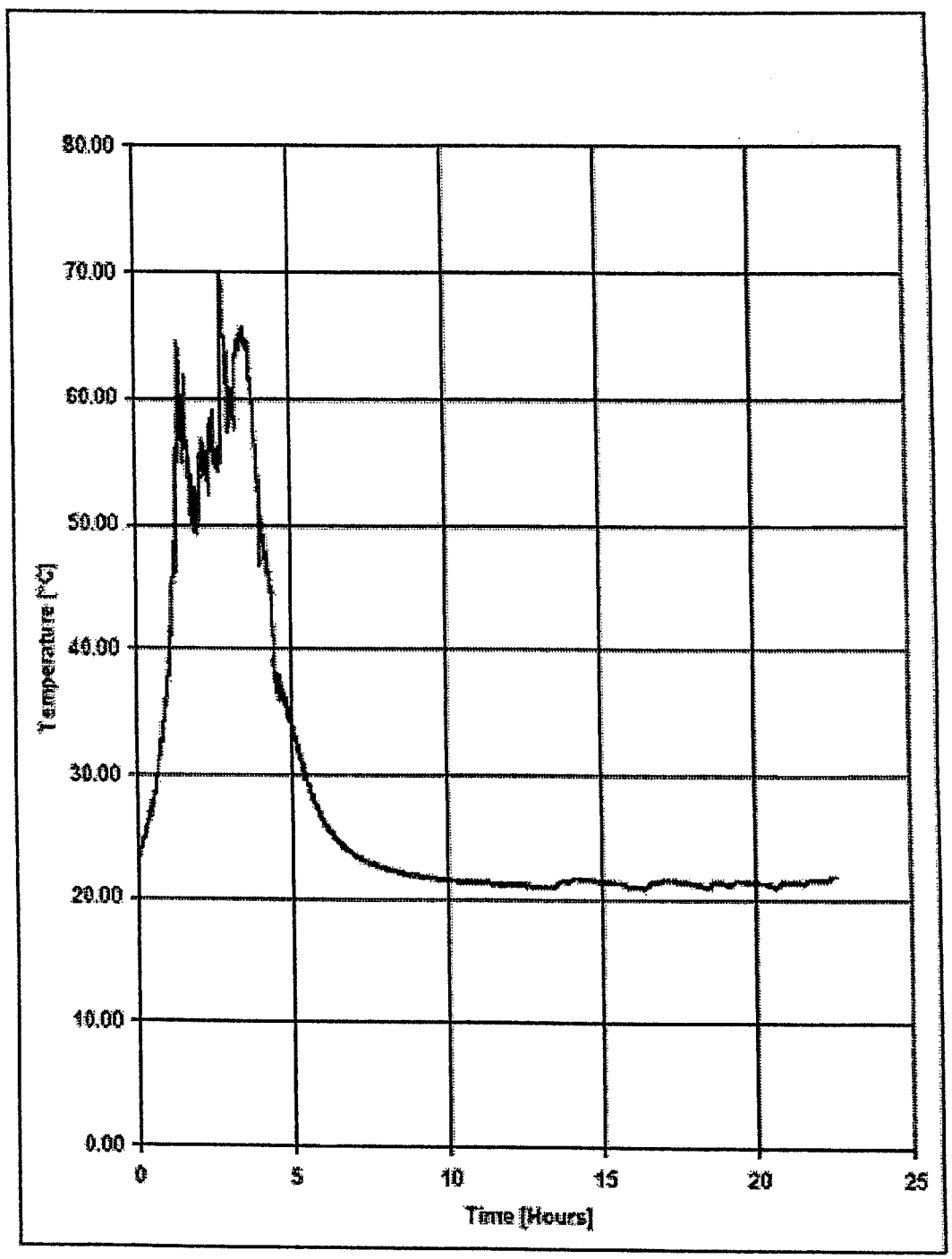
FIG. 7   a graph of the hydrogen generator temperature versus time for a hydrogen production by aluminum assisted water split according to the present invention.

DEVICE FOR AND METHOD OF STORAGE AND GENERATION OF HYDROGEN FOR AUTONOMOUS CURRENT SOURCES BASED ON FUEL CELLS

BACKGROUND OF THE INVENTION

The present invention relates to electric current sources based on fuel elements.

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, therefore, essential for many applications that can use hydrogen. In particular, minimizing volume, weight and complexity of the hydrogen storage systems are important factors in mobile applications.

The development of fuel cells as replacements for batteries in portable electronic devices, including many popular consumer electronics such as personal data assistants, cellular phones and laptop computers is dependent on finding a convenient and safe hydrogen source. The technology to create small-scale systems for hydrogen supply, storage and delivery has not yet matched the advancements in miniaturization achieved with fuel cells.

A hydrogen fuel cell for portable applications needs to be compact and lightweight, have a high gravimetric hydrogen storage density, and be operable in any orientation. Additionally, it should be easy to match the control of the system's hydrogen flow rate and pressure to the operating demands of the fuel cell.

The existing hydrogen storage options, which include compressed and liquid hydrogen, hydrided metal alloys, and carbon nanotubes, have characteristics which complicate their use in small consumer applications. For instance, compressed hydrogen and liquid hydrogen require heavy tanks and regulators for storage and delivery, metal hydrides require added heat to release their stored hydrogen, and carbon nanotubes must be kept pressurized.

Alternatives for hydrogen storage and generation include the class of compounds known as chemical hydrides, such as the alkali metal hydrides, the alkali metal aluminum hydrides and the alkali metal borohydride. The hydrolysis reactions of many complex metal hydrides, including sodium borohydride, (NaBH4) have been commonly used for the generation of hydrogen gas.

In those applications where a steady and constant supply of hydrogen is required, it is possible to construct hydrogen generation apparatus that control the contact of a catalyst with the hydride fuel. Such generators typically use a two-tank system, one for fuel and the other for discharged product. The hydrogen generation reaction occurs in a third chamber that contains a metal catalyst and connects the two tanks. However, such two-tank designs are not typically directionally independent or amenable to miniaturization.

SUMMARY OF THE INVENTION

Accordingly, it is an object of the present invention to provide a device for and method of storage and generation of hydrogen for autonomous current sources based on fuel cells, which constitutes a further improvement of the existing solutions.

In keeping with these objects and with others which will become apparent hereinafter, one feature of the present invention resides, briefly stated, in a device for producing hydrogen for power sources, comprising a housing; means for containing electrolyte in said housing; means for containing aluminum in said housing; means for periodically bringing the aluminum and the electrolyte in contact for production of hydrogen; and means for the withdrawing the hydrogen to a power source.

In accordance with the present invention, another feature of the present invention resides, briefly stated, in a method further comprising setting a predetermined pressure in said container so that when an interior of said housing is connected with a power source, a pressure which is lower than the said pressure is provided inside said container and the aluminum is brought in contact with the electrolyte, while after generation of hydrogen and withdrawal from said container when a pressure becomes again equal to the said pressure the aluminum and electrolyte are disengaged from one another and generation of hydrogen is stopped until a next cycle.

In the present invention the hydrogen production is performed by aluminum assisted water split in accordance with the following formula:

$$2Al + 6H_2O_{[in\ alkaline\ solution]} \rightarrow 2Al(OH)_3 + 3H_2 \uparrow$$

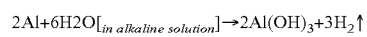

As a result of reaction of aluminum with water in alkaline medium, a pure hydrated aluminum oxide is produced $(AlOH_3 \cdot nH_2O)$ and hydrogen. The yield of hydrogen can be substantially 3.7%. Taking into consideration that a quantity of water required for reaction can be provided in half by a returned water generated in the electrochemical power system based on the fuel cell during the use of an energy device, the yield of hydrogen can reach 7-10%. The necessary condition of the reaction is a direct contact of all reactant (aqueous alkaline solution and aluminum) with each other. The quantity of produced hydrogen can be regulated by a magnitude of area of contact of the surfaces of particles of aluminum which interact with water.

The aluminum can be used in any form, such as foil, sheet, wire, granules (pellets) of regular and irregular shape. It is important to provide an optimal area of surface of reaction and its completeness. It is important that one of the linear sizes of the used form of aluminum parts is small and does not exceed 0.1-1 mm.

The important feature of the present invention is also the content of the electrolyte, in particular NaOH with addition of LiOH, $NaInO_2$ and $Na_4Ga_2O_3 \cdot nH_2O$.

The required quantities include 4 M of NaOH with 1-10 Wt % of the above mentioned additives.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a view showing a graph of hydrogen generation rate versus time for a hydrogen production by aluminum assisted water split according to the present invention;

FIG. 5 is a view showing a graph of a total amount of hydrogen produced versus time for hydrogen production by aluminum assisted water split according to the present invention;

FIG. 6 is a view showing a graph of a hydrogen output pressure versus time for a hydrogen production by aluminum assisted water split according to the present invention; and FIG. 7 is a view showing a graph of a hydrogen generation temperature versus time for hydrogen production by aluminum assisted water split according to the present invention.

DESCRIPTION OF THE PREFERRED EMBODIMENTS

Figure 1:
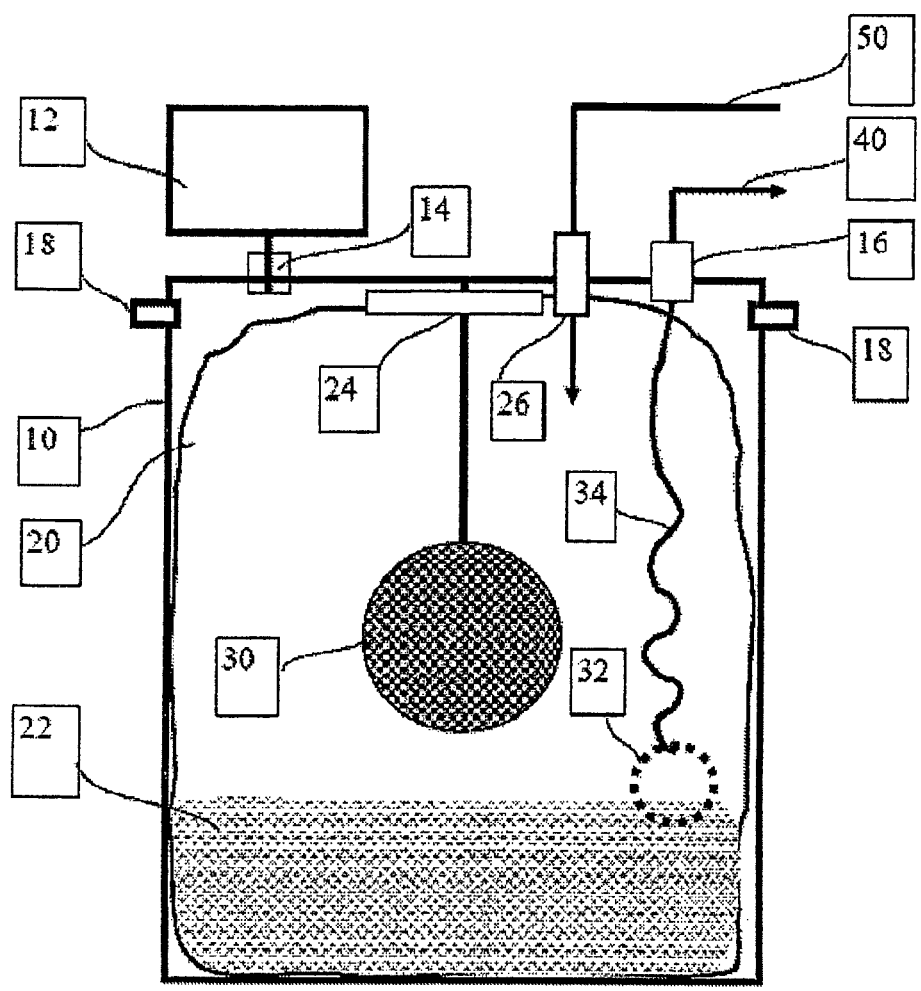
FIG. 1 is a view schematically showing a device for a hydrogen gas generation in accordance with the first embodiment of the present invention.

A device for hydrogen gas generation in accordance with one embodiment of the present invention is shown in FIG. 1. The device has a housing 10, a unit for setting a controlling pressure 12, a sealing unit 14 for sealing introduction of gas which sets the pressure, a unit 16 for sealing a pipe for supply of a generated hydrogen to a fuel cell, a unit 18 for sealing a removable lid of the device. The device further has a flexible bay 20 formed as an electrolyte container for accommodating electrolyte 22. The device further has a container 30 with a portion of aluminum, and a unit 24 for sealing the container with aluminum.

Reference numeral 26 identifies a unit of sealing a pipe for return of water from the fuel cell. The device further has unit 32 for filtration and withdrawal of generated hydrogen from the device, a flexible pipe 34 for withdrawal of the generated hydrogen from the flexible back 32, a pipe 40 for supplying the generated hydrogen to a fuel cell, and a pipe 50 for return of water from the fuel cell into the device.

The housing 10 can be composed of rigid material, for example from a thermoplastic material such as polyamide, ABC, and thermoreactive plastic material such as fluoroplastics or silicon elastomers. The container 20 for electrolyte is composed of an elastic material, for example from rubber EPDM or silicon rubber, and accommodates a required quantity of electrolyte needed for the chemical reaction. The container 30 with a portion of aluminum, the sealing unit 24, and the unit for filtration and removal of generated hydrogen is located inside the container 20.

The unit 32 for filtration and removal of the generated of the united hydrogen is connected through the sealing unit 16 by the flexible pipe 34 with a pipe for supply of hydrogen 40 to the fuel cell. The device for setting controlling pressure 12 is connected through the sealing unit 14 to the housing 10, and the pipe for return of water from the fuel cell 50 is connected to the housing 10 through the sealing unit 26. The housing 10 is composed of two parts connected with one another by the sealing unit 18.

In the initial position the device formed as a cartridge does not have active components. In order to supply the components into the cartridge, it is necessary to open the housing 10 in the sealing unit 18 which can be formed as screw connection, a bayonet connection or another fast connection, to disconnect the sealing unit 24, to pour aqueous solution, for example of 4 M Na OH with additives 1-10 Wt % LiOH, $NaInO_2$ and $Na_4Ga_2O_3*nH2O$ into the electrolyte container 20, to place the container 30 with a portion of aluminum inside the container 20, to seal the sealing unit 24, to seal the housing 10.

For activation of the device, it is necessary to connect the pipe for supply of hydrogen 40 to the fuel cell, and the pipe for return of water 50 to a corresponding part of the fuel cell.

After the connection of the pipe 40, insufficient pressure, relative to pressure set by the unit 12 is provided. This leads to squeezing of the electrolyte container 20 which is composed of elastic material, and the electrolyte 22 is brought into contact with the aluminum in the container 30, so that in accordance with the above mentioned reaction, generation of hydrogen starts. This process continues until the pressure inside the container 20 becomes equal to the pressure set by the setting unit 12. After the pressures inside the elements 12 and 20 become equal, electrolyte and aluminum are disconnected, and reaction of generation of hydrogen automatically stops until a next cycle. The next cycle starts when the pressure of hydrogen in the fuel cell again becomes smaller than the pressure set by the unit 12, and the process continues until a complete use of the reactants. As can be seen, the device formed as a cartridge can operate in any spatial orientation.

After the complete use of the reactants, the device is disconnected from the fuel cell and is recharged. For this purpose the housing 10 is open in the sealing unit 18, the sealing unit 24 is disconnected, the container 30 is removed from the container 20, the spent solution of electrolyte is removed from the container 20, and the container is washed, while the spent solution can be sent for recycling, a fresh solution specified herein above is introduced into the electrolyte container 20, the container 30 with a portion of aluminum is introduced into the container 20, the sealing unit 20 is sealed, the housing 20 is sealed, and the device is ready for next use.

Figure 2:
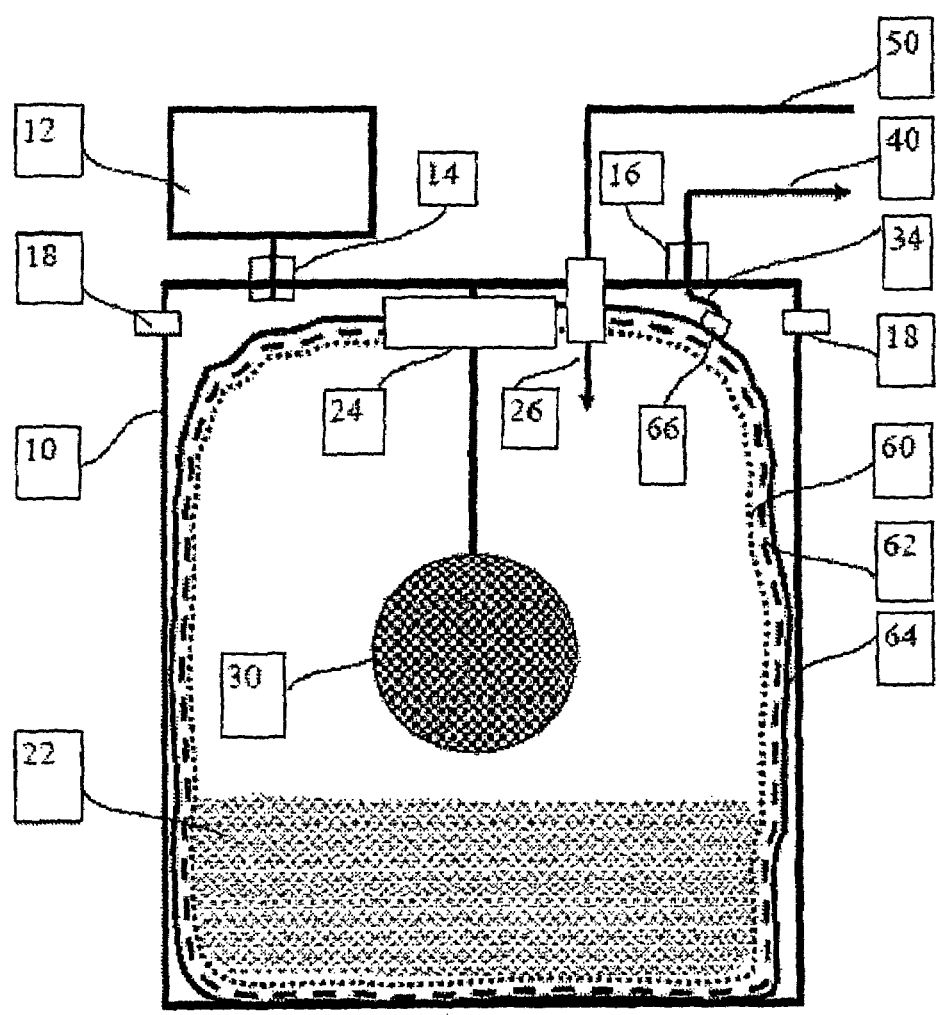
FIG. 2 is a view schematically showing a device for a hydrogen gas generation in accordance with the second embodiment of the present invention.

FIG. 2 shows another embodiment of the device in accordance with the present invention. The device has a housing 10, a unit 12 for setting controlling pressure, a unit 14 for sealing introduction of gas that sets by pressure, a unit 16 for sealing a pipe for supply of generated hydrogen into a fuel cell, a unit 18 for sealing a removable lid of the device. Reference numeral 22 identifies electrolyte. The device further has a container 30 with a portion of aluminum, a unit 24 for sealing the aluminum container, a unit 26 for sealing a pipe for return of water from a fuel cell, a flexible pipe 34 for removal of generated hydrogen from the flexible bag.

The device further has a pipe 40 for supplying generated hydrogen to the fuel cell, a pipe 50 for return of water from the fuel cell into the device. The device further has an internal bag 60 composed of a porous hydrophobic membrane which allows a passage of hydrogen a net 62 which can be formed as a plastic net and reinforced for providing a required gap between the internal bag 60 and a flexible bag 64. The flexible bag 64 is impermeable for hydrogen and electrolyte. Reference numeral 66 identifies a unit for withdrawal of hydrogen from the device.

In the device shown in FIG. 2 the housing 10 is also composed of rigid material as in the embodiment of FIG. 1. The container formed as a bag for electrolyte 64 is located inside the housing and composed of an elastic material such as EPDM rubber or silicon rubber with a supply of the electrolyte 22, and the container with a portion of aluminum 30. The internal bag 60 is composed of a gas permeable membrane known in the art and more permeable to hydrogen than water, such as silicon rubber, fluoropolymer, or any common hydrogen-permeable metal membrane, such as palladium-gold alloy membrane. Another bag 62 composed of a plastic mesh or net, for example of polyethylene or polypropylene fluoroplastic and another material which is resistant in alkali solutions, is provided between the elements 60 and 64 for obtaining a gap therebetween. The container 30 with a portion of aluminum and electrolyte 22 are introduced into the container 64 through the hermetically sealed window 24. The unit for withdrawal of hydrogen 66 is arranged on the container 64 and connected by the flexible pipe 34, which through the sealing unit 16 is connected with the pipe 40 for supply of hydrogen to the fuel cell. The unit 12 for setting controlling pressure and the pipe for return of water from the cell 50 are connected through the sealing unit 14 and the sealing unit 26 correspondingly to the housing 10. The housing 10 is composed of two parts connected with one another by the sealing unit 18.

As in the previous embodiment, in the initial position there are no reactants in the device. It is then necessary to open the housing 10 in the area of the sealing unit 18, to disconnect the sealing unit 24, to introduce the electrolyte into the container 20, to place the container 30 with a portion of aluminum into the container 60-64, to seal the unit 24 and the housing 10.

In order to activate the device it is necessary to connect the device 40 for supply of hydrogen to the fuel cell and the pipe of 50 for return of water to the corresponding parts of the fuel cell. After the connection of the pipe 40 an insufficient pressure relative to the pressure set by the unit 12 is provided. This leads to squeezing of the composite container for electrolyte 60-64, which is composed of the elastic material, the electrolyte 22 is brought in contact with aluminum in the container 30, and hydrogen is generated in accordance with the above mentioned reaction. After equalization of the pressure inside the elements 20 and 64, the electrolyte and aluminum are disengaged from one another and the reaction of generation of hydrogen automatically stops until the next cycle. The next cycle starts when pressure of hydrogen in the fuel cell again becomes lower than the pressure set by the unit 12, and the process continues till full use of reactants.

After the complete use of reactants the device is disconnected from the fuel cell and is recharged. For this purpose the housing 10 is open in the area of the sealing unit 18, the sealing unit 24 is disconnected, the container 30 is removed from the composite container 60-64, the electrolyte is removed from the container 20 and washed, and the spent solution is sent for recycling, a fresh solution of the electrolyte is introduced into the composite container 60-64, the container 30 with the portion of aluminum is introduced into the composite container 60-64, the unit 24 is sealed, and the housing 10 is sealed.

Figure 3:
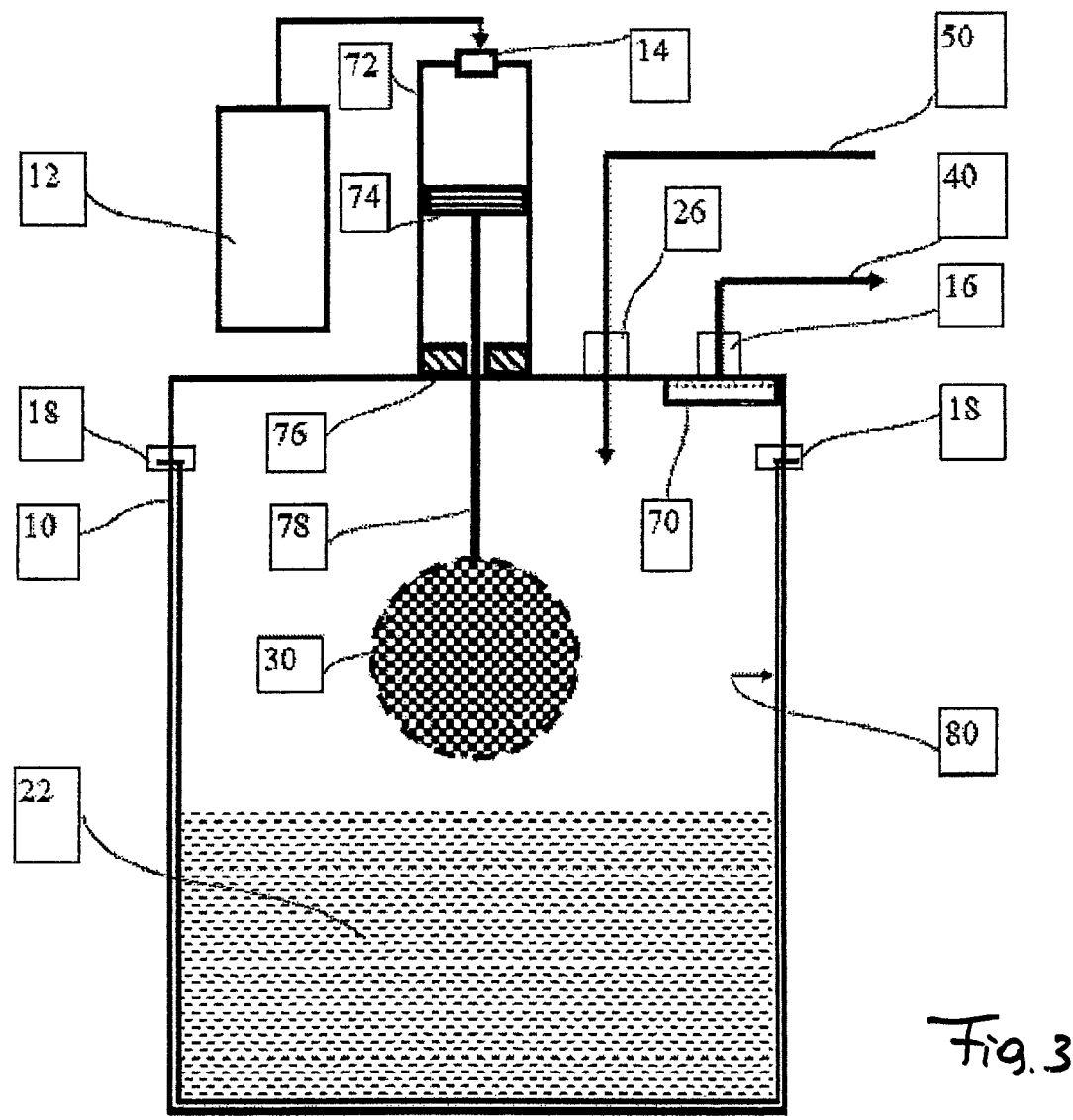
FIG. 3 is a view schematically showing a device for a hydrogen gas generation in accordance with the third embodiment of the present invention.

FIG. 3 shows another embodiment of the present invention. The device for hydrogen generation has a housing 10, a unit 12 for setting controlling pressure, a unit 14 for sealing introduction of gas which sets the pressure, a unit 16 for sealing a pipe for supply of generated hydrogen to a fuel cell, a unit 18 for sealing a removable lid of the device. Reference numeral 22 identifies electrolyte. The device further has a unit 76 for sealing the container with aluminum, a unit 26 for sealing a pipe for return of water from the fuel cell, a container 30 with a portion of aluminum, a pipe 40 for supply of generated hydrogen to the fuel cell, a pipe 50 for return of water from the fuel cell, a unit 70 for removal of hydrogen from the device, a cylinder 72 providing a displacement of aluminum container by means of a piston rod 78 under the action of the gas from the unit 12, a piston 74, and a unit for sealing the piston rod 78. The device further has a flexible bag 80 which is impermeable for hydrogen and electrolyte.

As before, the housing 10 is composed of a solid material, for example a plastic material. The container or bag for electrolyte 80 composed of an elastic material, for example of EPDM rubber or silicon rubber or plastic with the electrolyte 22 is located in the housing. The housing 10 is composed of two parts removably connectable by the sealing unit 18. The electrolyte container 80 is connected to the housing 10 in the area of the sealing unit 18. The unit for filtration and removal of hydrogen 70 with the pipe 40 for supply of hydrogen to the fuel cell and the device for regulating the position of the container 30 with aluminum relative to the level of the electrolyte 20 are located in an upper part of the housing 10. This regulating device includes the unit 12 for setting a controlled pressure, the cylinder 72 with the piston 74, the piston rod 78 and the sealing unit 76, the pipe 50 for water return from the fuel cell through this sealing unit 26. The pipe 50 for return of water from the fuel cell is connected to the housing 10 through the sealing unit 26.

As in the previous embodiments for introducing reactants it is necessary to open the housing 10, to introduce the electrolyte into the container 80, to connect the container 30 with aluminum to the piston rod 78 at a corresponding height, to seal the housing 10.

For activation of the device it is necessary to connect the pipe 40 for hydrogen to the fuel cell and the pipe 50 for water return to the corresponding part of the fuel cell. Immediately after the connection of the pipe 40 an insufficient pressure relative to the pressure set by the unit 20 is produced. This leads to lowering of the container 30 with aluminum till its contact with the electrolyte 22, and they are brought in contact with one another, whereafter in accordance with the above mentioned reaction generation of hydrogen starts. The process will continue till the pressure inside the housing 10 equalizes with the pressure set by the unit 12. After the equalization of the pressures the container 30 with aluminum connected to the piston rod 78 moves upwardly, the electrolyte and aluminum are disengaged with one another, and the reaction stops until a next cycle. The next cycle starts when the pressure of hydrogen in the fuel cell transmitted into the housing 10 is again less than the pressure set by the element 12, and the process continues until complete use of the reagents. The device can work in a substantial vertical position +/−30°. After the use of the reactants the device is disconnected from the fuel cell and is recharged/replaced correspondingly.

It should be mentioned that the container 30 for aluminum is configured so as to provide a contact of the electrolyte with the aluminum in the container. The container 7 can be formed as a mesh, net, etc, which allows the above mentioned contact. The important feature of the present invention is that the aluminum is provided in form of small particles with a thickness substantially not exceeding 0.1-1 mm. This provides a high degree of contact between the aluminum and the electrolyte and high efficiency of the process.

The inventive device and method have been tested. An example is presented herein below just for illustration purposes and is not to be constructed as limitation of the present invention, since many deviations are possible without a parting of the spirit and scope of the invention.

The device shown in FIG. 3 is utilized here as an example. It was constructed to bench test of the invention. 300 ml of 4 M of solution NaOH with corresponding additives was introduced into the flexible bag 80. 65 gram of industrial aluminum alloy 6061 was introduced into the container 30 as a band with a thickness of 1 mm, wound into a spiral with an outer diameter approximately 75 mm. The test was made for obtaining hydrogen in the quantity of approximately 180 liter with a flow rate approximately 0.65 liter per minute during approximately 5 hours. The results of this experiment are shown in FIGS. 4, 5, 6 and 7. 207,089 liter of hydrogen was produced with efficiency of 0.677 liter per minute during 5 hours. During the test a low pressure set by the self regulating system has observed inside the device as shown in FIG. 6 and a corresponding calculated value of temperatures as shown in FIG. 7. It clearly shows that the device and method can be used as a hydrogen source for portable fuel cell power systems and also for industrial/residential power systems and electric vehicle operations.

It will be understood that each of the elements described above, or two or more together, may also find a useful application in other types of constructions and methods differing from the type described above.

While the invention has been illustrated and described as embodied in a device for and method of storage and generation of hydrogen for autonomous current sources based on fuel cells, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for producing hydrogen for power sources, comprising a housing; means for containing electrolyte NaOH with additives consisting of LiOH, $NaInO_2$ and $Na_4Ga_2O_3 \cdot _nH_2O$ in said housing; means for containing aluminum in said housing; means for periodically bringing the aluminum and the electrolyte in contact for production of hydrogen; and means for withdrawing the hydrogen to a fuel cell power source, wherein said means for containing aluminum contain a plurality of aluminum parts with a thickness not exceeding 0.1 mm.

2. A method for producing hydrogen for power sources, comprising the steps of providing a housing; containing electrolyte NaOH with additives consisting of LiOH, $NaInO_2$ and $Na_4Ga_2O_3 \cdot _nH_2O$ in means for containing electrolyte in said housing; containing aluminum in means for containing aluminum in said housing; periodically bring the aluminum in contact with the electrolyte to produce hydrogen; withdrawing the produced hydrogen to a power source; and using the aluminum composed of a plurality of aluminum parts with a thickness not exceeding 0.1 mm wherein said means for containing electrolyte is a hydrogen and electrolyte permeable flexible container connected to the housing, said means for containing aluminum is a separate electrolyte permeable bag, said means for periodically bringing in contact is a separate cylinder-piston unit with a piston rod moving said bag in said container, and said withdrawing means is a separate means arranged in a cover of said housing.

* * * * *